United States Patent

[11] 3,579,247

[72] Inventors Kiyomi Minohara;
Hiroshi Ishida, Nishinomiya; Tomoyoshi Miyata; Takeyoshi Takashima, Kobe; Yoichi Umehara, Nishinomiya, Japan
[21] Appl. No. 841,437
[22] Filed July 14, 1969
[45] Patented May 18, 1971
[73] Assignee Furuno Electric Company, Ltd. Minamitakaki-gu, Nagasakiken, Japan
[32] Priority July 15, 1968, Dec. 5, 1968
[33] Japan
[31] 43/50142 and 43/89453

[54] MULTISTYLUS PEN RECORDING SYSTEM
7 Claims, 7 Drawing Figs.
[52] U.S. Cl................................................. 346/35, 340/3, 343/5
[51] Int. Cl....................................................... G01d 5/47, G01s 7/60

[50] Field of Search.......................................... 346/33 (EC), 35; 340/3 (R)(F); 343/5 (PR)

[56] References Cited
UNITED STATES PATENTS
2,955,284 10/1960 Thorsen........................ 343/11
3,091,762 5/1963 Schwertz..................... 343/11

*Primary Examiner*—Joseph W. Hartary
*Attorney*—Eugene E. Geoffrey, Jr.

ABSTRACT: A multistylus pen recording system having a plurality of styli arranged transversely of and in contact with recording paper, means for generating a series of signal pulses which are applied in sequence to the styli for recording said pulses and means for producing a selectively variable high frequency signal to control the spacing of said pulses and thereby effect a variation in the magnification of the pattern recorded on the paper.

INVENTORS
KIYOMI MINOHARA
HIROSHI ISHIDA
TOMOYOSHI MIYATA
TAKEYOSHI TAKASHIMA
YOICHI UMEHARA
BY
ATTORNEY

INVENTORS
KIYOMI MINOHARA
HIROSHI ISHIDA
TOMOYOSHI MIYATA
TAKEYOSHI TAKASHIMA
YOICHI UMEHARA
BY
ATTORNEY

MULTISTYLUS PEN RECORDING SYSTEM

This invention relates to a multistylus pen recording system and specifically to a novel and improved system particularly useful in facsimile reproduction, fish-detecting devices, acoustic water depth measuring devices and the like wherein areas are scanned by repeated transmission and reception of signals in a predetermined manner.

Prior known devices have utilized a plurality of styli arranged transversely of recording paper for recording signals repeatedly transmitted and received as in the case of water depth devices, fish detector devices and the like. With known apparatus constant frequency switching signals have been utilized to control the switching operation for application of the received signals in sequence to the styli. With such an arrangement the recorded pattern is uniform throughout the width of the paper.

This invention provides an improved recording system particularly useful in the detection of fish schools, water depth measuring devices, supersonic flaw detectors such as flaw detectors for rails and the like wherein selected portions of the recording can be greatly magnified in order to provide a more accurate indication of selected portions of the recording.

Accordingly, one object of the invention resides in the provision of a novel and improved recorder utilizing a multiplicity of styli wherein selected portions of the recording can be enlarged or contracted as desired.

The foregoing object has been accomplished by an improved system for modifying the switching cycle and applying received signals to the styli wherein the selected portions can be contracted or expanded as may be desired. One procedure for the attainment of this end involves the utilization of a plurality of oscillators having different frequencies and wherein selected oscillators may be used during selected periods to effect expansion or contraction of the recorded signal. In the alternative means may be employed for dividing the frequency of the oscillator and utilization of the various frequencies obtained by frequency division for effecting the same result.

The above and other objects of the invention will become more apparent from the following description and accompanying drawings forming part of this application.

Figure 1:
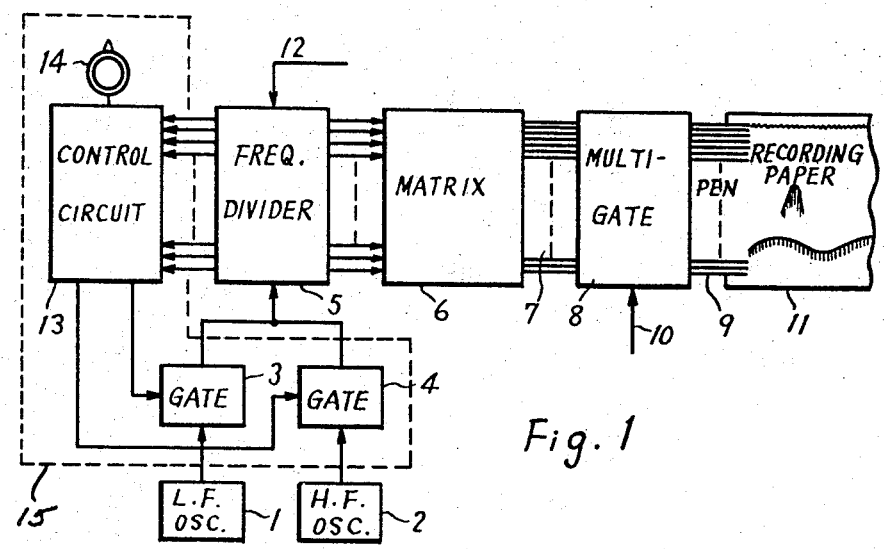
FIG. 1 is a block diagram of one embodiment of the invention useful among other things as a fish detector and utilizing oscillators of different frequencies.

Referring to FIG. 1 illustrating one embodiment of the invention for use as a fish detector, the numeral 1 denotes a relatively low frequency oscillator which may produce a frequency for example of 1,920 Hz. A second oscillator is denoted by the numeral 2 and has a higher frequency as for example 3,840 Hz. The outputs of the oscillators 1 and 2 are fed through gates 3 and 4 to a frequency divider 5. The frequency divider 5 comprises a cascade connection of binary circuits and sequentially divides the input frequency to a frequency of one two-hundred-fifty-sixth of the input frequency.

Figure 2:
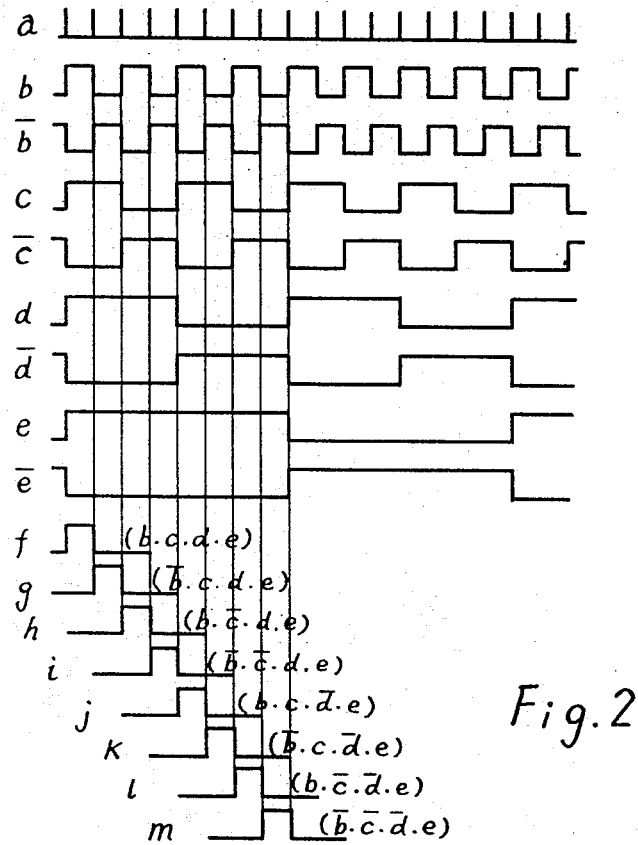
FIG. 2 is a graph showing the waveforms produced by the various units shown in the device in FIG. 1.

The letters $a$ through $\bar{e}$ of FIG. 2 show the waveforms obtained from the frequency divider 5 with the input wave being illustrated at $a$, the first frequency division being shown at $b$, and a frequency division output of reverse polarity $\bar{b}$, all of which appear simultaneously. The next stage of the frequency divider produces outputs $c$ and $\bar{c}$ and the succeeding outputs are denoted as $d, \bar{d}$, and $e, \bar{e}$.

All of the outputs $b$ through $\bar{e}$ shown in FIG. 2 are supplied to a matrix circuit 6 so that rectangular pulses as shown at $f$ through $m$ of FIG. 2 are produced and are fed in sequence to the output lines 7. In the instant embodiment of the invention the rectangular pulse $f$ is an AND output of the frequency divider outputs $b, c, d,$ and $e$; the rectangular pulse $g$ is an AND output of the frequency divider outputs $\bar{b}, c, d,$ and $e$; the rectangular pulse $h$ is an AND output of the frequency divider outputs $b, \bar{c}, d,$ and $e$; the rectangular pulse $i$ is an AND output of the frequency divider outputs $\bar{b}, \bar{c}, d,$ and $e$; the rectangular pulse $j$ is an AND output of the frequency divider outputs $b, c, \bar{d},$ and $e$; the rectangular pulse $k$ is an AND output of the frequency divider outputs $\bar{b}, c, \bar{d},$ and $e$; the rectangular pulse $l$ is an AND output of the frequency divider outputs $b, \bar{c}, \bar{d},$ and $e$; and the rectangular pulse $m$ is an AND output of the frequency divider outputs $\bar{b}, \bar{c}, \bar{d},$ and $e$. The total number of rectangular pulses are 256, and the duration of each pulse is equal to the period of the input wave to the frequency divider 5.

A multigate circuit 8 receives the rectangular pulses $f$ through $m$ from the lines or conductors 7, and the outputs thereof are connected to recording styli or pens 9. In the instant embodiment of the invention a total of 256 styli are utilized to record an incoming signal from the input 10 to the multigate 8. Each one of the styli produces a recording on the recording paper 11 during the presence of a rectangular pulse on the conductor 7 connecting the matrix 6 with the multigate 8. The styli 9 are always in contact with the recording paper 11 and the styli produce recordings on the paper successively as from the top to the bottom as illustrated in FIG. 1.

If the recording paper 11 is fed at a speed of a few centimeters per minute, the recording operation described above is performed in synchronization with the repetitive incoming signals and a pattern is produced on the recording paper 11. The frequency divider 5 is reset by a reset signal supplied by an input 12 at the conclusion of each complete recording operation.

As pointed out above, the instant invention employs two oscillators 1 and 2, and one or the other of the outputs of said oscillators is selected by the gate circuits 3 and 4 to be fed to the frequency divider 5. The opening and closing of the gate circuits 3 and 4 is controlled by a control circuit 13. The control circuit 13 has a structure similar to that of the matrix circuit 6 and receives outputs from the frequency divider 5, namely, outputs $b$ through $\bar{e}$, as shown in FIG. 2. The control circuit 13 supplies gate signals having durations of a selected period to one or the other gate circuits 3 and 4 to close one of them. The time and duration of each control signal can be determined by the operation of a control knob 14. That portion of FIG. 1 enclosed by the broken line 15 constitutes in effect the principal improvement over the prior art.

The foregoing embodiment of the invention is particularly useful as a fish detector and for purposes of this description its operation will be described in connection with that application.

Figure 3A:
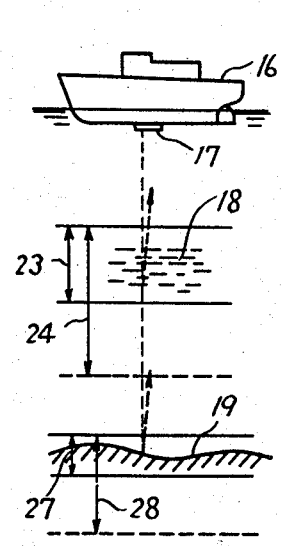
FIG. 3a is an explanatory diagram illustrating the utilization of the device of FIG. 1 as a fish detector.
Figure 3:
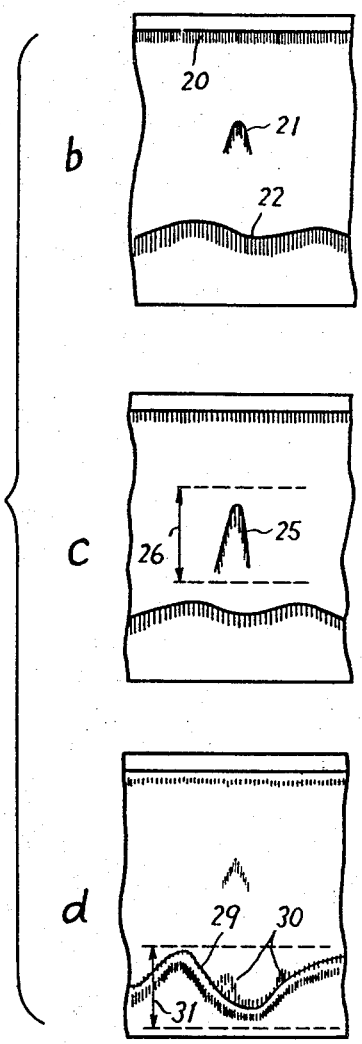
FIG. 3b illustrates a recorded pattern obtained by a convention fish detector.
FIG. 3c illustrates a recorded pattern obtained with apparatus in accordance with the invention showing enlargement of the fish school indicated in FIG. 3b.
FIG. 3d is a recorded pattern produced by the detector of FIG. 1 showing enlargement of the seabed.

When a supersonic wave pulse is emitted from a transducer 17 positioned at the bottom of a fishing boat 16 as shown in FIG. 3a, a reflected wave will be produced from a school of fish 18 and a second reflected wave will be produced by the seabed 19. If the output of oscillator 1 is introduced into the frequency divider 5, a recorded image as illustrated in FIG. 3b will be obtained. In this FIG. the numeral 20 denotes the water surface, the numeral 21 the fish school, and the numeral 22 the seabed. If the frequency of oscillator 1 is 1,920 Hz. and the number of styli is 256, then the total range of the record will be 100 meters.

If it is desired to enlarge the portion 23 of FIG. 3a in order to show the fish school 18 in greater detail on the recording, the gate circuit 3 is closed during the receipt of reflected waves other than those reflected from the area denoted by the numeral 24. During the period in which waves are reflected from the area 24, the gate circuit 3 is opened and the gate circuit 4 is closed in which case the output of the higher frequency oscillator will be fed to the frequency divider 5. As a result the fish school denoted by the numeral 25 in FIG. 3c will be greatly enlarged as it will have occurred during the portion 26 of FIG. 3c which corresponds to the portion 24 of FIG. 3a. The position and extent of the portion to be enlarged can be readily adjusted by the knob 14 as shown in FIG. 1. On the other hand, if it is desired to enlarge the seabed section 27 of FIG. 3a which is included within that portion 28 so that details of a fish school in the vicinity of the seabed can be more thoroughly investigated, the gate circuit 3 is open during the period corresponding to the portion 28 while the gate circuit 4 is closed during that period corresponding to the portion 27. When the gate circuit 4 is closed, the output of oscillator 2 is fed to the frequency divider 5. Therefore, the seabed image 29 of FIG. 3d will be greatly enlarged and the presence of fish 30 in the vicinity of the seabed can be more easily determined. The numeral 31 denotes the range over which the enlarged recording is obtained. As in the previous case, the position and extent of the enlarged portion 27 can be adjusted by the knob 14.

In connection with FIGS. 3c and 3d, if that portion of the record which is not enlarged was controlled by an oscillator having a frequency of 1,920 Hz. as explained above and if that portion of the recording which is enlarged was controlled by an oscillator having a frequency of 3,840 Hz., then the magnification of the enlarged portion is twice that of the unenlarged portion. Thus the enlargement or magnification is equal to the ratio of the frequency of the two oscillators. If the frequency of oscillator 2 is variable, then the magnitude of the enlargement will also be variable.

Figure 4:
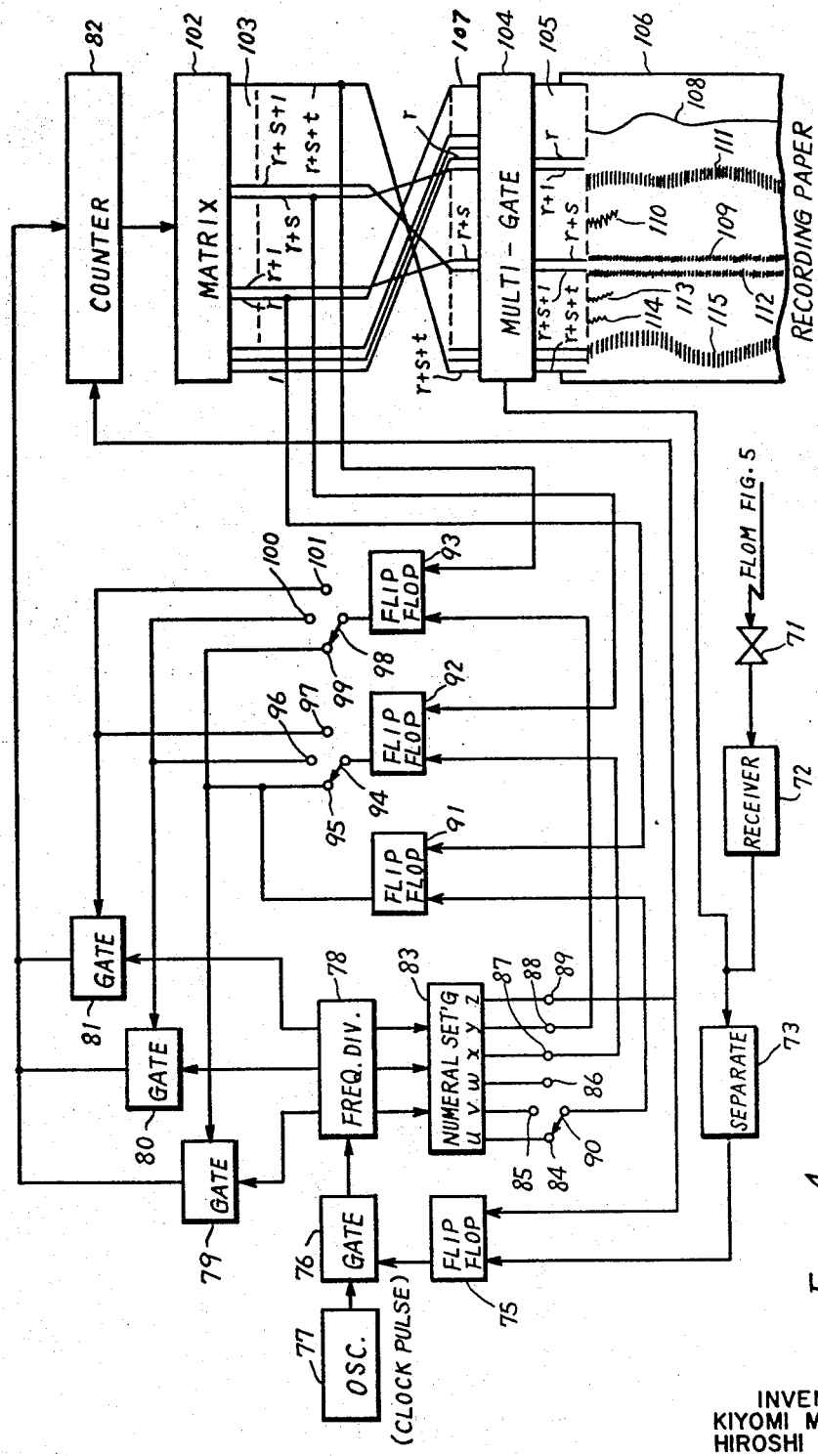
FIG. 4 is a block diagram of the apparatus in accordance with the invention for use in a water-telemetering system for trolling nets wherein an oscillator output and frequency divided output of the oscillator are interchangeably utilized as styli-switching signals.

FIG. 4 illustrates an example of an embodiment of the invention suitable for attachment to a trolling net for monitoring the degree to which the net is open, the water depth, the water temperature, and the presence of fish in the vicinity.

Figure 5:
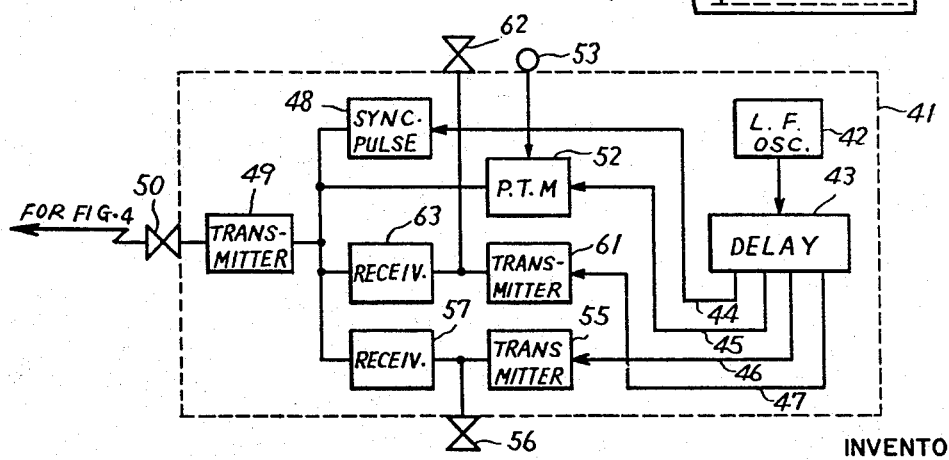
FIG. 5 is a block diagram of a device carried by a trolling net for use in conjunction with the apparatus illustrated in FIG. 4.

FIG. 5 illustrates a device for transmitting signals to the apparatus illustrated in FIG. 4, the latter being enclosed within a pressure resistant watertight container 41 which is mounted at the upper part of the open portion of the net. A low frequency oscillator 42 oscillates at a period T as illustrated at $a$ in FIG. 6. The output of oscillator 42 is fed to a delay circuit 43. The delay circuit has outputs 44, 45, 46, and 47. The basic oscillator frequency is fed to the output 4 while the same frequency is applied to outputs 45, 46, and 47 at time delays $t_1$, $t_2$, and $t_3$. The signal on output 44 is shaped by a synchronizing pulse-producing circuit 48. The output of the transmitter 49 is modulated by the pulsed synchronizing signal and is transmitted by a transducer 50 as a supersonic wave having an envelope such as that illustrated at 51 in graph $a$ of FIG. 6. The output 45 is fed to the pulse time modulation circuit 52 and receives a time modulation input from a water temperature detecting device 53. The time-modulated pulse modulates the output of transmitter 49 and produces a supersonic wave having an envelope as shown at 54 in graph $a$ of FIG. 6. This signal is also transmitted by the transducer 50. The output 46 is fed to a transmitter 55 and causes a supersonic pulse to be emitted from a transducer 56 facing downwardly. Reflected waves, from the seabed, and fish are also received by the transducer 56 and are fed through a receiver 57 to the transmitter 49 to produce supersonic signals having envelopes such as shown at 58, 59 and 60 of graph $a$ of FIG. 6. The waveform 58 represents the pulse transmitted from the transmitter 55. The waveform 59 may represent fish and the waveform 60 may represent the seabed. The output 47 controls a transmitter 61 and causes a supersonic wave to be transmitted upwardly from the transducer 62. Reflected waves that may be produced by fish and from the water surface are received by the transducer 62. These signals are amplified and detected by the receiver 63, and the output of that receiver modulates the transmitter 49 and produces supersonic waves to be emitted from the transducer 50 having envelopes as shown at 64 through 67 in graph $a$ of FIG. 6. The waveforms 64 through 67 represent the transmitted pulse, reflected waves from fish at two different places and reflected waves from the water surface.

Figure 6:
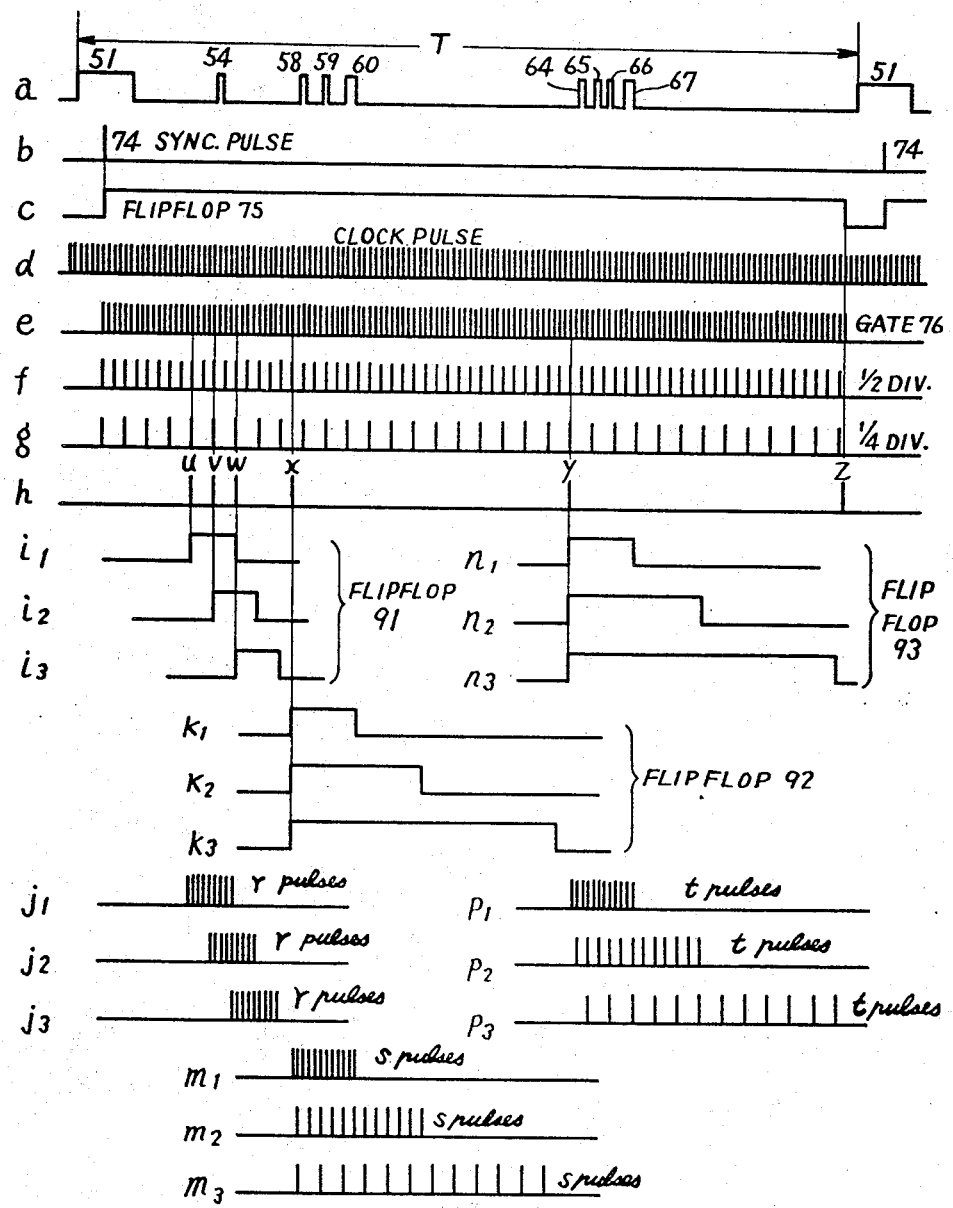
FIG. 6 is a graph showing the waveforms of the various units of FIG. 4.

The supersonic signals transmitted by the transducer 50 of FIG. 5 are received by the transducer 71 of FIG. 4 and are fed to the receiver 72 which produces an output corresponding to the output shown in graph $a$ of FIG. 6. The synchronizing signal 51 is detected and shaped by the separation circuit 73 using a synchronizing signal separation technique utilized in normal pulse communication. Thus a synchronizing signal 74 as shown in graph $b$ of FIG. 6 is produced. A flip-flop 75 is actuated by the synchronizing pulse 74 and is reset by a second signal which will be subsequently discussed. The gate circuit 76 is closed during a selected period as illustrated in graph $c$ of FIG. 6, and a clock pulse as illustrated in graph $d$ of FIG. 6 and generated by oscillator 77 will pass through the gate circuit 76 as illustrated in graph $e$ of FIG. 6. A frequency divider 78 consisting of a cascade connection of binary circuits successively divides the clock pulse frequency which passes through the gate 76 in order to produce frequency divided outputs having frequencies of one-half and one-fourth as illustrated in graphs $f$ and $g$ of FIG. 6. The clock pulse $e$ of FIG. 6 and the frequency divided outputs at $f$ and $g$ of FIG. 6 are fed through the gate circuits 79, 80, and 81 to the counter circuit 82.

The binary circuits of the frequency divider 78 are also fed to the numerical value setting circuit 83 which has a structure similar to that of the matrix circuit 6 of FIG. 1. The numerical value setting circuit 83 is so arranged so that when each of the clock pulses of the sequential orders $u$, $v$, $w$, $x$, $y$, and $z$ as illustrated in graph $h$ of FIG. 6 are counted from the time gate circuit 76 is closed to feed the clock pulse to the frequency divider 78 output signals are produced at the output terminals 84 through 89. The above-mentioned numerical values $u$ through $z$ are such that $u$ is the smallest value, and the values increase to a maximum value at $z$. The terminals 84, 85, and 86 are fixed terminals of a switch having a movable contactor 90.

The numerals 91, 92, and 93 denote flip-flop circuits. The circuit 91 is set as illustrated at $i_1$, $i_2$, and $i_3$ of FIG. 6 and either one of the clock pulses of the sequential orders $u$, $v$, and $w$ are selected by the position of the contactor 90. During the set period the gate circuit 79 is closed causing the clock pulse to pass therethrough as illustrated at $j_1$ or $j_2$ of FIG. 6. This clock pulse is then fed to the counter circuit 82.

The flip-flop circuit 92 is connected to the output terminal 87 and is set by a clock pulse of the sequential order $x$ as illustrated at $k_1$, $k_2$, or $k_3$ of FIG. 6. A switch having a movable contactor 94 is connected to the output of the flip-flop 92 and the switch has three fixed contact points 95, 96, and 97 which are connected to control terminals of the gate circuits 79, 80, and 81. Accordingly, the output of flip-flop 92 is supplied to the gate circuit which is selected by the switch contactor 94 to close the gate circuit during its set period and cause a clock pulse frequency division output of the frequency divider 78 to pass therethrough and to the counter circuit 82 as illustrated at $m_1$, $m_2$, or $m_3$ of FIG. 6.

The flip-flop circuit 93 is connected to the output terminal 88 of the numerical value setting circuit 83 and is set by a clock pulse of the sequential order $y$ as shown at $n_1$, $n_2$, or $n_3$ of FIG. 6. A switch having a contact arm 98 is connected to the output of flip-flop 93 and the switch has contact points 99, 100, and 101 which are connected to control terminals of the gate circuits 79, 80, and 81. Accordingly the output of this flip-flop during its set period closes a gate circuit selected by the contacting arm 98 and causes a clock pulse of the frequency divider output to pass therethrough whereupon it is fed to the counter circuit 82 as shown at $P_1$, $P_2$, or $P_3$ of FIG. 6.

The counter circuit 82 counts the clock pulse frequency or a divided frequency output which is supplied by one of the gates 79, 80, or 81. A matrix circuit 102 which is similar to the matrix circuit 6 of FIG. 1 produces a plurality of outputs 103 starting at the left as shown in FIG. 4 as the counting operation of counter 82 is performed. The outputs 103 of the matrix circuit 102 are connected to the multigate circuit 104 which is similar to the multigate circuit 8 of FIG. 1, and it distributes the output of receiver 72 to the styli which are similar to the styli 9 of FIG. 1. Recording paper 106 is fed outwardly and in contact with the styli electrodes 105.

The connections between the matrix circuit 102 and the multigate circuit 104 are arranged in the following manner as may be observed in FIG. 4. First through $r$th counted from the left of the output lines 103 are respectively connected to $r$th counted from the right to the right end of input lines 107 of the multigate circuit 104. $(r+1)$ th through $(r+s)$ th counted from the left end of the output lines 103 are respectively connected to $(r+s)$ th through $(r+1)$ th counted from the right end of the input lines 107. $(r+s+1)$ th through the right end counted from the left of the output lines 103 are respectively connected to $(r+s+1)$ th through the left end or $(r+s+t)$ th counted from the right of the input lines 107.

The above-described embodiment of the invention will now be explained under the condition that switches 90, 94, and 98 are set at the contact points 84, 95, and 99.

When the synchronizing signal 51 is received by the receiver 73, the synchronizing pulse 74 shown at $b$ or FIG. 6 is produced at the synchronizing separation circuit 73 and the flip-flop circuit 75 is closed by the synchronizing pulse as shown at $c$ in FIG. 6. As the flip-flop circuit 75 is closed, the gate circuit 76 is also closed and the clock pulse generated by oscillator 77 passes therethrough as illustrated at $e$ of FIG. 6. Thus the clock pulse is fed to the frequency divider 78. When the clock pulse is fed to the frequency divider 78, divided outputs of one-half and one-fourth of the frequency (see $f$ and $g$ of FIG. 6) are applied to the input terminals of the gate circuits 79, 80, and 81. This time the gate circuits 79, 80, and 81 are open.

When the clock pulse of sequential order $u$ counted from the start of the operation of frequency divider 78 is produced, the numerical value setting circuit 83 feeds this output signal to terminal 84 as shown at $u$ of graph $h$ in FIG. 6. The flip-flop circuit 91 is set by this output as shown at $i_1$ of FIG. 6 whereupon gate circuit 79 is closed and the clock pulse is fed to the counter circuit 82 as shown at $j_1$ of FIG. 6. Each time the counter circuit 82 counts a clock pulse an output appears in order from left to right at the outputs 103 of the matrix circuit 102. As the outputs 103 appear successively, the multigate circuit 104 switches the output of the receiver 72 from $r$th, one of the styli electrodes 105, to the other styli electrodes counted from the right to the left. During this time the water temperature signal 54 illustrated at $a$ in FIG. 6 appears at the output of receiver 72 and a water temperature indication 108 is recorded at a position on the recording paper 106 which corresponds to the time of appearance of said signal. When the clock pulse of the sequential order $u$ appears at one of the output lines 103, namely, $r$th, the flip-flop 91 is reset as indicated at $i_1$ of FIG. 6, and the gate 79 is open whereupon the counter circuit 82 discontinues the counting. When the clock pulse of the sequential order $x$ appears at the output terminal 87 of the numerical value setting circuit 83, flip-flop circuit 92 is set as shown at $k_1$ of FIG. 6. Thereupon gate circuit 79 is closed and the clock pulse is fed to the counter circuit 82 as indicated at $m_1$ of FIG. 6. An output then appears at one of the output lines 103 of the matrix circuit 102, namely, $(r+1)$th, and the signals appear on the output lines 103 from left to right. The output of receiver 72 is thereby supplied to the styli 105 starting from $(r+s)$th sequentially starting from the right-hand side. During this time the downwardly emitted pulse 58, the fish reflection pulse 59 and the seabed reflection pulse 60 as shown at $a$ of FIG. 6 are received in sequence and are recorded at corresponding positions on the recording paper denoted by the numerals 109, 110, and 111, respectively.

When the counter circuit 82 counts the clock pulse of the sequential order $(r+s)$th, an output appears at output line 103, namely, $(r+s)$th, which resets the flip-flop circuit 92 and opens the gate 79 whereupon operation of the counter circuit 82 is again terminated.

After the gate circuit 76 is closed and a clock pulse of the sequential order $y$th arrives at the frequency divider 78, output appears at the terminal 88 of the numerical value setting circuit 83. This causes the flip-flop circuit 93 to be set as shown at $n_1$ or FIG. 6 and this in turn causes the gate circuit 79 to introduce the clock pulse into the counter 82. Counting is thereby resumed as shown at $P_1$ of FIG. 6. An output signal then appears on the output line 103 $(r+s+1)$th and is applied sequentially to the output lines 103 from the left. During this time the output of receiver 72 is supplied to the styli electrodes 105 sequentially from the styli $(r+s+1)$th from right to left. This causes the emitter pulse 64, the fish reflection pulses 65 and 66 and the water surface reflection pulse 67 as shown at $a$ in FIG. 6 to be recorded in order and are illustrated at corresponding positions on the recording paper which are denoted by the numerals 112, 113, 114, and 115. When the counter circuit 83 counts the clock pulse of the sequential order $(r+s+t)$th an output appears at the right-hand output line 103 which in turn resets flip-flop circuit 93 and opens the gate circuit 79.

When a clock pulse of sequential order $z$th arrives at the frequency divider 78, an output appears at the terminal 89 as shown in $h$ of FIG. 6. This causes the flip-flop circuit 75 to be reset as shown at $c$ in FIG. 6 whereupon the gate circuit 76 is open and the counter circuit 82 is reset. Thereupon the synchronizing signal 51 is again produced and the foregoing operation is repeated.

When the contactor arm 90 of the numerical value setting circuit is moved to contacts 85 or 86, the period during which the gate circuit 79 is closed varies as shown at $i_2$ or $i_3$ of FIG. 6 and the clock pulse counted by the counter circuit 82 is varied as shown at $j_2$ or $j_3$ of FIG. 6. This procedure modifies the temperature range recorded on the recording paper. For example, when the contact arm 90 is on the switch point 84, water temperatures from $-10°$ C. to $+10°$ C. are recorded. When the movable contactor 90 is on the contact points 85 or 86, water temperatures in the ranges of $0°$ C. to $20°$ C. and from $10°$ C. to $30°$ C. are recorded.

When the switch arm 94 at the output of flip-flop circuit 92 is moved to contacts 96 or 97, the flip-flop circuit is set for periods as shown at $k_2$ and $k_3$ of FIG. 6. Thus the gate circuit 80 or 81 as the case may be is opened and frequency divisions of one-half or one-fourth frequency are introduced into the counter circuit 82 as indicated at $m_1$ or $m_2$ of FIG. 6. This causes a change in the switching rate of the styli electrodes $(r+1 \text{ay} \text{th}$ through $(r+s)$th at the multigate circuit 104. The switching speed is thus reduced to one-half or one-fourth so that the range of the recorded depth is doubled or quadrupled. In other words the magnification of the recorded image is reduced by one-half or one-fourth as the case may be.

When the switch arm 98 of flip-flop 93 is switched to contact points 100 or 101, the set period of flip-flop 93 varies as indicated at $n_2$ or $n_3$ of FIG. 6. The waveform thus fed to the counter circuit 82 through the gate circuit 80 or 81 is converted to one-half or one-fourth of the frequency. As a result, the switching speed of the signals to the styli electrodes $(r+s+1)$th through $(r+s+t)$th is decreased to one-half or one-fourth so that the range of the recorded depth is doubled or quadrupled as the case may be.

We claim:

1. A recording system comprising a recorder having a plurality of styli, means for feeding recording paper beneath said styli and electrical means for operating each of said styli for recording electrical signals on said paper, switching means for applying incoming signals to said electrical means to actuate said styli in a predetermined order, means generating periodic switching signals, connections between said generating means and said switching means for controlling said switching means and means connected with said generating means for varying the periodicity of said switching signals whereby the periodicity of the application of said incoming signals to said electrical means may be varied throughout the width of said recording paper to amplify selected recorded portions of said incoming signals.

2. A recording system according to claim 1 wherein said generating means comprises a plurality of oscillators having different frequencies and said means for varying said switching signals comprises means for feeding selected oscillator signals to said switching means.

3. A recording system according to claim 1 wherein said generating means comprises at least one oscillator, frequency-dividing means for reducing the frequency of said oscillator and said means for varying said switching signals comprises means for selectively feeding said oscillator frequency and said reduced frequency to said switching means.

4. A recording system according to claim 3 wherein said frequency-dividing means includes at least two frequency dividers for producing at least two different divided frequencies to be selectively fed to said switching means.

5. A recording system according to claim 1 wherein said generating means includes a counter for counting said switching signals and connections between said counter and said means for varying the periodicity of said switching signals whereby said counter controls the operation of said varying means.

6. A recording system according to claim 5 wherein said counting means comprises a frequency divider consisting of cascade connected binary circuits and said system further includes a matrix circuit connected to each of said binary circuits and having a plurality of output terminals, said matrix circuit producing an output signal at selected output terminals as the counter attains selected values whereby the periodicity of said switching signals is varied as outputs are produced at selected output terminals.

7. A recording system according to claim 1 wherein said generating means comprises means for producing a plurality of pulsed switching signals of different periodicities, counting means connected with the last said means for counting said pulses, gates connecting said pulse producing means with said switching means and flip-flops interconnected with said gates and said counting means whereby said flip-flops are activated at selected count values to open and close said gates.